US012804462B2

(12) United States Patent
Bashir et al.

(10) Patent No.: US 12,804,462 B2
(45) Date of Patent: Nov. 17, 2026

(54) FLEXIBLE MODEL COMMUNICATION SERVICES IN PRIMARY AND SECONDARY USER PLANE FUNCTION TRACKING AREAS

(71) Applicant: Boost SubscriberCo L.L.C., Englewood, CO (US)

(72) Inventors: Kazi Bashir, Lewisville, TX (US); Mehdi Alasti, Arlington, VA (US); Siddhartha Chenumolu, Ashburn, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 536 days.

(21) Appl. No.: 18/457,242

(22) Filed: Aug. 28, 2023

(65) Prior Publication Data

US 2025/0081038 A1 Mar. 6, 2025

(51) Int. Cl.

| | |
|---|---|
| ***H04W 28/082*** | (2023.01) |
| ***H04L 5/00*** | (2006.01) |
| ***H04L 67/14*** | (2022.01) |
| ***H04W 64/00*** | (2009.01) |

(52) U.S. Cl.

CPC ......... *H04W 28/082* (2023.05); *H04L 5/0048* (2013.01); *H04W 64/003* (2013.01); *H04L 67/14* (2013.01)

(58) Field of Classification Search

CPC ............. H04W 28/082; H04W 64/003; H04W 28/0942; H04W 48/18; H04L 5/0048; H04L 67/14; H04L 67/1004

See application file for complete search history.

(56) References Cited

U.S. PATENT DOCUMENTS

| | | | |
|---|---|---|---|
| 10,397,758 | B2 | 8/2019 | Albasheir et al. |
| 11,051,207 | B2 | 6/2021 | Nieminen |
| 11,483,738 | B1 | 10/2022 | Alasti et al. |

(Continued)

FOREIGN PATENT DOCUMENTS

| | | |
|---|---|---|
| CN | 115134936 A | 9/2022 |
| WO | 2018166336 A1 | 9/2018 |

OTHER PUBLICATIONS

3GPP TS 23.501 version 16.12.0 Release 16; 5G; System architecture for the 5G System (5GS). (Year: 2022).*

(Continued)

*Primary Examiner* — Oussama Roudani

(74) *Attorney, Agent, or Firm* — Seed Intellectual Property Law Group LLP

(57) ABSTRACT

Systems and method dynamically determine provisioning of networking services. A service area is serviced by a first user plane function (UPF) as a primary service area and by a second UPF as a secondary service area. A request is received from a user equipment to connect to a network, and a location of the user equipment is identified. Determination is made whether the location is in the first service area. A first load of the first UPF is determined. In response to the first load not exceeding a load threshold value, the user equipment is connected to the first UPF. In response to the first load exceeding the load threshold value, the user equipment is connected to the second UPF when a second load thereof does not exceed the first load or to the first UPF when the second load exceeds the first load.

20 Claims, 8 Drawing Sheets

(56) References Cited

U.S. PATENT DOCUMENTS

| | | | | |
|---|---|---|---|---|
| 11,659,454 | B2 | 5/2023 | Dao et al. | |
| 11,758,436 | B2 | 9/2023 | Narath et al. | |
| 11,818,603 | B2 | 11/2023 | Park et al. | |
| 11,889,352 | B2 | 1/2024 | Arora et al. | |
| 12,047,457 | B2 * | 7/2024 | Ma | H04L 67/14 |
| 2019/0075431 | A1 * | 3/2019 | Albasheir | H04L 67/52 |
| 2019/0313468 | A1 * | 10/2019 | Talebi Fard | H04W 60/04 |
| 2020/0170055 | A1 * | 5/2020 | Dou | H04W 76/22 |
| 2021/0152989 | A1 * | 5/2021 | Chai | H04L 12/1407 |
| 2021/0160761 | A1 | 5/2021 | Albasheir et al. | |
| 2022/0167211 | A1 | 5/2022 | Sharma et al. | |
| 2023/0066148 | A1 | 3/2023 | Alasti et al. | |
| 2023/0135699 | A1 * | 5/2023 | Liao | H04W 4/50<br>370/252 |
| 2024/0323125 | A1 | 9/2024 | Kim et al. | |
| 2024/0340847 | A1 * | 10/2024 | Soryal | H04W 68/00 |
| 2025/0227538 | A1 | 7/2025 | Min et al. | |

OTHER PUBLICATIONS

International Search Report and Written Opinion for PCT Application No. PCT/US2024/043695, dated Dec. 6, 2024, 14 pages.

International Search Report and Written Opinion for PCT Application No. PCT/US2024/040955, dated Oct. 18, 2024, 14 pages.

ETSI, 5G; System architecture for the 5G System (5GS) (3GPP TS 23.501 version 16.12.0 Release 16), ETSI, TS 123 501 V16.12.0 (Year: 2022).

* cited by examiner

FLEXIBLE MODEL COMMUNICATION SERVICES IN PRIMARY AND SECONDARY USER PLANE FUNCTION TRACKING AREAS

TECHNICAL FIELD

The present disclosure relates generally to network provisioning and, more particularly, to dynamically determining how to provision networking services.

BACKGROUND

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The advent and implementation of 5G technology has resulted in faster speeds and increased bandwidth. The design and deployment of such a wireless network relies on a great number of hardware and computing resources. Unfortunately, different types of computing tasks generally utilize different computing resources, which can increase the amount of overhead needed to support such computing tasks. It is with respect to these and other considerations that the embodiments described herein have been made.

BRIEF SUMMARY

Briefly described, embodiments are directed toward systems and methods of dynamically determining how to provision networking services. First and second user plane functions (UPFs) are initialized for first and second service areas. The first UPF services the first service area as a primary service area and the second service area as a secondary service area. The second UPF services the second service area as a primary service area and the first service area as a secondary service area. The second service area and the first service area may be non-overlapping, or having an overlap that is less than a select amount (e.g., the overlap is less than a select percentage or threshold amount). A request is received from a user equipment to connect to a network, and a location of the user equipment is identified. A determination is made whether the location is in one of the first and second service areas. In response to the location being in the first service area, a first load of the first user plane function is determined. In response to the first load not exceeding a load threshold value, the user equipment is connected to the first user plane function. In response to the first load exceeding the load threshold value, a second load of the second user plane function is determined. In response to the first load exceeding the second load, the user equipment is connected to the second user plane function. In response to the second load exceeding the first load, the user equipment is connected to the first user plane function.

A determination of whether the first load exceeds a load threshold value may be made while the user equipment is connected to the first user plane function. In response to the first load exceeding the load threshold value, an IP anchor point of the user equipment may be switched from the first user plane function to the second user plane function under session and service continuity mode 1, 2 or 3. When mode 2 or 3 is available, the IP anchor point may be switched directly. When mode 1 is available, a determination may be made whether the user equipment is dormant. In response to determining that the user equipment is dormant, the user equipment may be disconnected from the first user plane function. When a request is received from the user equipment to reconnect, the user equipment may be connected to the second user plane function. The load of the first user plane function may be reassessed when the request to reconnect is received, and if the first user plane function continues to exceed the load threshold value, the user equipment may be connected to the second user plane function. The user equipment may be connected to the first user plane function if the first user plane function is below the load threshold value when the request to reconnect is received.

When determining the first and second loads, a first future load and a second future load may be determined, which may be predicted by a network data analysis function. First and second weighting percentages may be generated based on the first and second future loads. The second weighting percentage may be greater than the first weighting percentage when the first future load exceeds the second future load, or vice versa. A plurality of second user equipment may be connected to the first and second user plane functions based on the first and second weighting percentages, respectively. The first and second weighting percentages may be calculated based on current loads, future loads and number of tracking areas in the overlap area.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
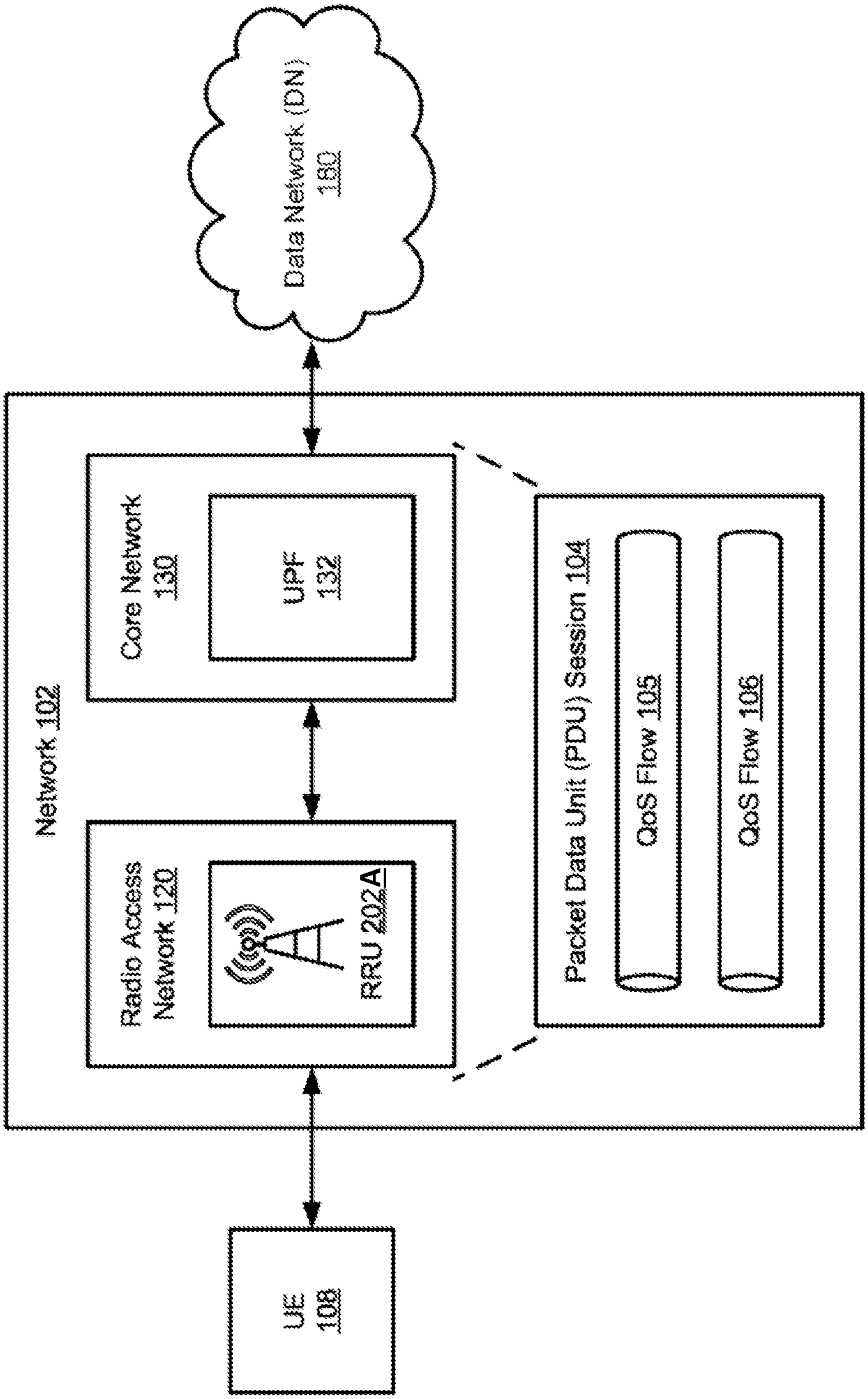
FIG. 1A depicts an embodiment of a 5G network including a radio access network (RAN) and a core network.

FIG. 1A depicts an embodiment of a 5G network 102 including a radio access network (RAN) 120 and a core network 130. The radio access network 120 may comprise a new-generation radio access network (NG-RAN) that uses the 5G new radio interface (NR). The 5G network 102 connects user equipment (UE) 108 to the data network (DN) 180 using the radio access network 120 and the core network 130. The data network 180 may comprise the Internet, a local area network (LAN), a wide area network (WAN), a private data network, a wireless network, a wired network, or a combination of networks.

The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, Internet-of-Things (IoT) devices, and/or any other electronic computing device that includes a wireless communications interface to access the radio access network 120.

The radio access network 120 may include a remote radio unit (RRU) 202A for wirelessly communicating with UE 108. The remote radio unit (RRU) 202A may include one or more radio transceivers for wirelessly communicating with UE 108. In some embodiments, the radio access network 120 includes a radio unit (RU) 202 (depicted in FIGS. 1B and 1C) that may be a lower physical layer of a 5G gNodeB (or "gNB") that itself is all digital. The remote radio unit (RRU) 202A may include circuitry for converting signals sent to and from an antenna of a base station into digital signals for transmission over packet networks. In some embodiments, the RRU 202A is omitted. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core control plane (CP) network functions are virtualized and implemented as loosely coupled independent services that communicate with each other, for example, using HTTP2 protocols and APIs. In some cases, control plane functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

In many 5G networks, the SMF performs user plane selection to connect a user equipment 108 to components of the 5G network 102, such as a data network. The user equipment 108 may initially send a request to a node, such as a base station, that is associated with a tracking area (TA). The TA groups together a set of base stations in a geographical area, which allows the 5G network 102 to efficiently manage UE 108 mobility and handover between base stations. The TA can cover a relatively large geographic area, such as a city or a region, and may be identified by a tracking area identifier (TA ID). A single UPF 132 may provide mobility support for a group of TAs, which may also be referred to as a UPF service area. The SMF may manage a group of UPFs that each service a respective UPF service area, the collection of which may be referred to as an SMF service area. Detailed description of the above is provided with reference to FIGS. 2 and 3.

Although many TAs may be serviced by only a single UPF 132, some TAs may be serviced by two or more UPFs 132. For example, each of two UPFs 132 may service a respective primary service area and secondary service area, which is described in greater detail with reference to FIG. 3. The primary service area of one UPF may be a secondary service area of the other UPF, and the primary service area of the other UPF may be the secondary service area of the one UPF. In some cases, utilized capacity or "loading" of the two UPFs may be quite different from each other, which may lead to overutilization of one of the two UPFs and underutilization of the other of the two UPFs.

Embodiments of the disclosure connect UEs in the UPF service area of each UPF in a manner beneficial to improve utilization of resources of the two UPFs. In one embodiment, a connection request is received from a UE that is in a TA that is located in a primary service area of a first UPF and a secondary service area of a second UPF. If either of the first and second UPFs has load that exceeds a load threshold value (e.g., 70%), the UE is connected to the other of the first and second UPFs. As such, the UE in the secondary service area of, for example, the second UPF may be connected to the second UPF when the load of the first UPF exceeds the load threshold value instead of connecting the UE to the first UPF, even though the UE is in the primary service area of the first UPF. In another embodiment, the UE is connected to the UPF that has lower load upon requesting to connect. Description of the above embodiments is provided at least with reference to FIG. 4.

In yet another embodiment, already connected UEs in either of the two UPF service areas may be reassigned to one of the two UPFs based on the load of the other UPF exceeding the load threshold value. For example, an IP anchor point may be transferred directly from one UPF to the other UPF. In another example, the IP anchor point may be connected to the other UPF following disconnecting the UE after the UE goes dormant. Description of the above embodiments is provided at least with reference to FIG. 5.

In the above, the load or loading may refer to current load or a future load, for example, as predicted by a network data analysis function (NWDAF). In the embodiments described with reference to FIG. 5, for example, reassigning of UEs may be performed on the basis of respective predicted future loads of the two UPFs that service the TAs in primary and secondary service areas.

Figure 1B:
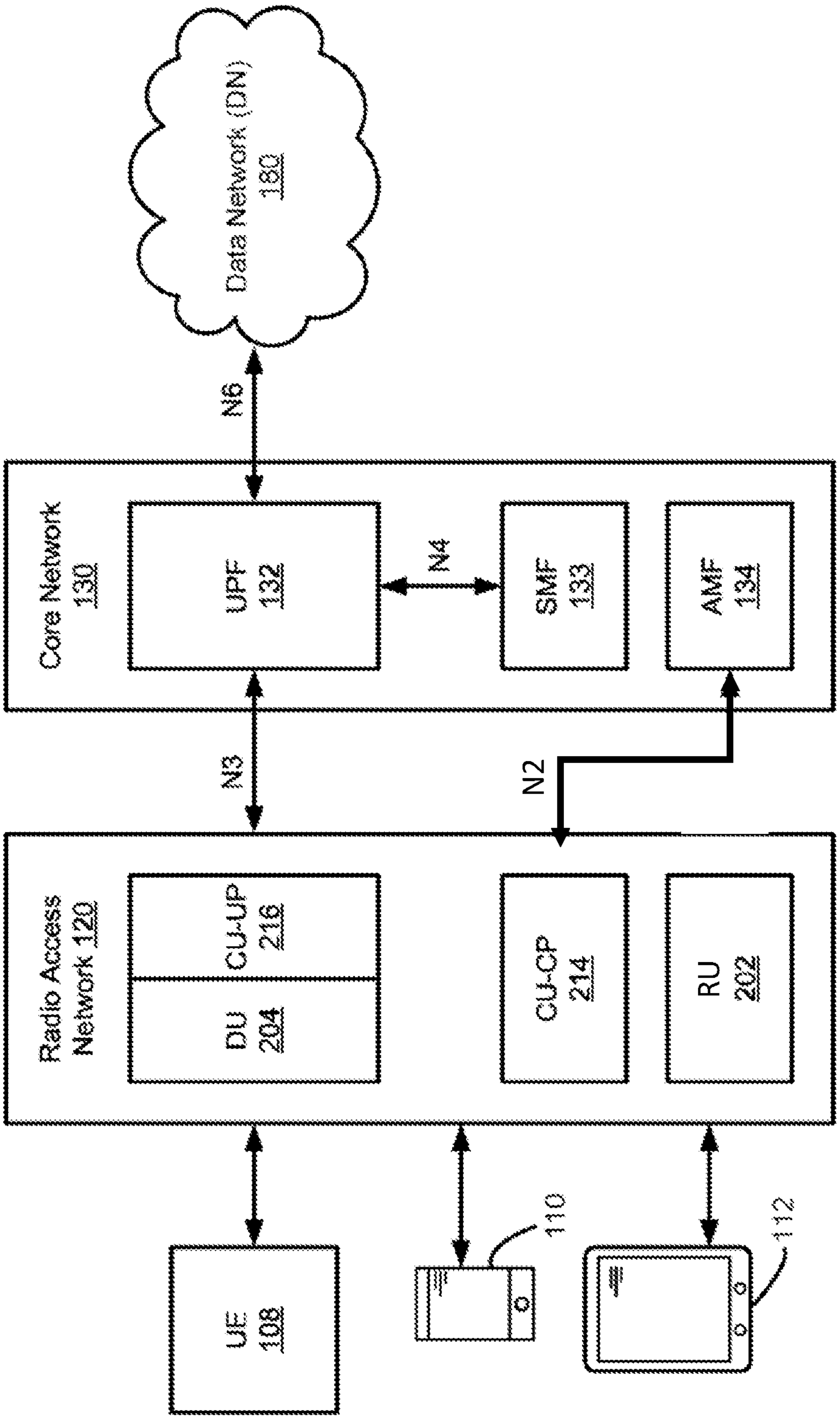
FIGS. 1B and 1C depict various embodiments of a radio access network and a core network for providing a communications channel (or channel) between user equipment and data network.
Figure 1C:
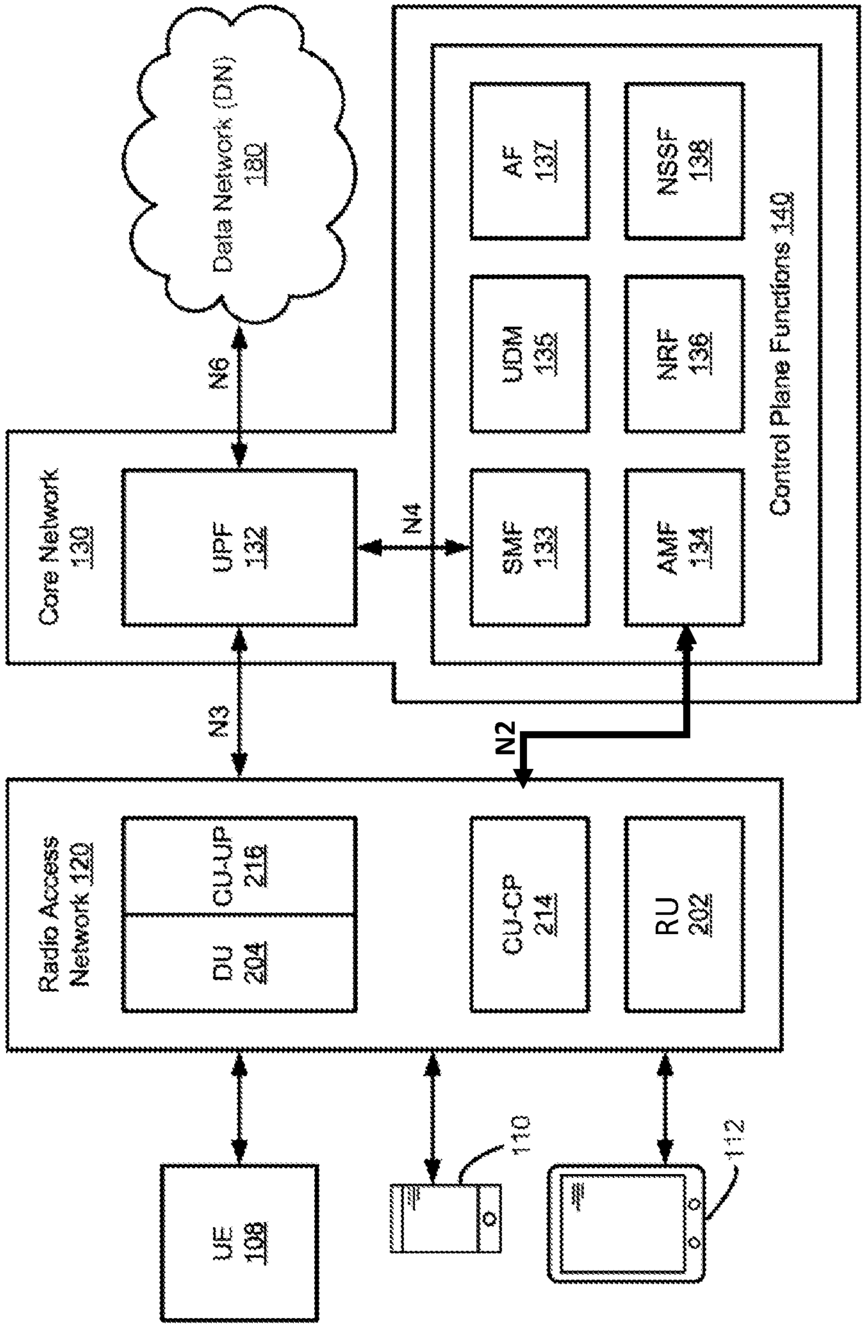

Further detailed description of the network depicted in FIGS. 1A-1C follows. The description of the network in FIGS. 1A-1C provides context in describing the network in which the embodiments of FIGS. 2-5 may be used.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should be granted the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202A. In other embodiments, the distributed unit (DU) and the radio unit (RU) 202 may be co-located at a cell site and the centralized unit (CU) may be located within a local data center (LDC).

The 5G network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the 5G network 102. In some cases, the 5G network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the 5G network 102 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The 5G network 102 may connect the UE 108 to the data network 180 using a packet data unit (PDU) session 104, which may comprise part of an overlay network.

The PDU session 104 may utilize one or more quality of service (QoS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the 5G network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more radio units (RUs) that includes radio transceivers (or combinations of radio transmitters and receivers) for wirelessly communicating with UEs. The set of RUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RU).

In some cases, the UE 108 may be capable of transmitting signals to and receiving signals from one or more RUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1A, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before being forwarded towards the appropriate radio access network 120. A QoS flow may correspond with a stream of data packets that have equal quality of service (QOS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1B, during setup of the PDU session 104. The SMF may generate the set of SDF templates using information provided from a policy control function (PCF), such as the PCF 135 depicted in FIG. 1C. The UPF 132 may track various statistics regarding the volume of data transferred by each PDU session, such as PDU session 104, and provide the information to an SMF.

FIG. 1B depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a radio unit (RU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RUs (e.g., 18 RUs). In this case, a single CU may manage 10 different cell sites (or cellular base stations) and 180 different RUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

FIG. 1C depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

Figure 2:
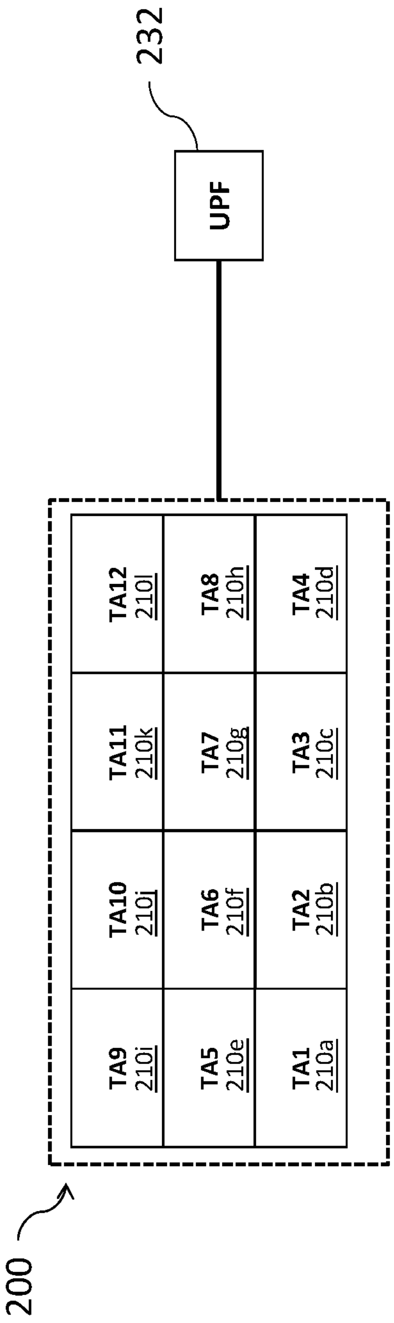
FIG. 2 depicts an embodiment of tracking areas of a network being managed by a user plane function (UPF) in accordance with embodiments described herein.

FIG. 2 depicts an embodiment of a user plane function (UPF) 232 in accordance with embodiments described herein. The UPF 232 may be the same as or similar to the UPF 132 depicted in FIGS. 1A-1C, and is an embodiment of the UPF 132. Each UPF, such as the UPF 232, may be associated with a plurality of tracking areas (TAs) 200. Each of the TAs may be a geographical area in which a UE can move around while maintaining the same radio connection with the 5G network. The tracking area is different from a cell coverage area. A cell coverage area refers to the geographical area covered by a single base station or a group of base stations working together. The coverage area of a cell can vary depending on factors such as the frequency band used, the transmit power of the base station, and the presence of obstacles such as buildings or trees. The purpose of a TA may be to group together a set of base stations in a particular geographical area, which allows the network to efficiently manage UE mobility and handover between base stations. The TA can cover a relatively large geographic area, such as a city or a region, and it is identified by a TA ID.

When the UE moves from one TA to another, the UE may inform the 5G network, and the 5G network updates location information of the UE accordingly. The 5G network may then use the updated location information to determine the appropriate UPF to use for handling user data forwarding and processing for the UE. For example, when a UE moves to a different TA, the UE may perform a tracking area update (TAU) procedure to update location information thereof in the core network. The UE sends a TAU request message to the AMF in the core network, which includes information about current location of the UE and the new TA the UE is moving to. The AMF may then check the location information of the UE against a database of TAs and associated base stations. If the new location corresponds to a different TA, the AMF updates the location information and sends a TAU accept message to the UE, indicating that the TAU procedure was successful. In another example, the 5G network may use signaling messages between the UE and the base stations to determine the location of the UE and track movement thereof. For example, the UE may periodically send measurement reports to the base stations indicating signal quality of neighboring cells. The 5G network may use the measurement reports to determine when the UE moves to a different TA and needs to perform a TAU procedure. The 5G network may use a combination of UE signaling and network protocols to track the UE's location and detect when it moves from one TA to another.

As shown in FIG. 2, the UPF 232 may be associated with twelve or more TAs, which may include a first TA (TA1) 210*a*, second TA (TA2) 210*b*, third TA (TA3) 210*c*, fourth TA (TA4) 210*d*, fifth TA (TA5) 210*e*, sixth TA (TA6) 210*f*, seventh TA (TA7) 210*g*, eighth TA (TA8) 210*h*, ninth TA (TA9) 210*i*, tenth TA (TA10) 210*j*, eleventh TA (TA11) 210*k* and twelfth TA (TA12) 2101, which may be referred to collectively as the tracking areas 210*a*-2101 or individually as a tracking area 210. The plurality of TAs 200 may be referred to as a UPF service area 200, which is an area including one or more TAs within which a PDU Session (e.g., the PDU 104) associated with the UPF 232 can be served by 5G radio base stations (e.g., gNBs) via an N3 interface between the RAN (e.g., the RAN 120) and the UPF 232 without need to add a new UPF in between or to remove or re-allocate the UPF 232. Although FIG. 2 illustrates tracking areas 210*a*-2101 and UPF service area 200 as being rectangular, embodiments are not so limited. Rather, UPF service areas 200 and tracking areas 210 may be any regular or irregular shape created by the coverage areas of the base station(s) associated with that tracking area or service area. Although twelve TAs are depicted in FIG. 2, fewer or more TAs may be included in the UPF service area 200.

An overload value or overload threshold value may be selected that indicates whether the UPF 232 is overloaded. The UPF 232 operating at a selected percentage of its capacity, which may be the overload value, may be referred to as "overloaded." For example, the overload value may be a selected percentage of UPF capacity, such as 70% of UPF capacity. In various embodiments, an administrator may select the overload value or overload threshold for the UPF 232, which may differ from the overload value or overload threshold for other UPFs (not illustrated). The overload value or overload threshold may also change based on the time of day, day of the week, time of year, scheduling of events in the UPF service area 200, or other networking considerations that may dynamically impact the load on the UPF 232. The UPF service area 200 may be designed beneficially such that overload probability (e.g., probability that the UPF 232 enters the overloaded state) is below a selected low level based on a call model. The overload probability in one example may be 1%. Such a model, in which overload value is 70% to achieve overload probability of 1%, may result in overprovisioning, namely, underutilization of resources. When such a design is static, some UPFs may be overloaded while other UPFs are underloaded. Intelligent service area design may enhance UPF utilization.

Figure 3:
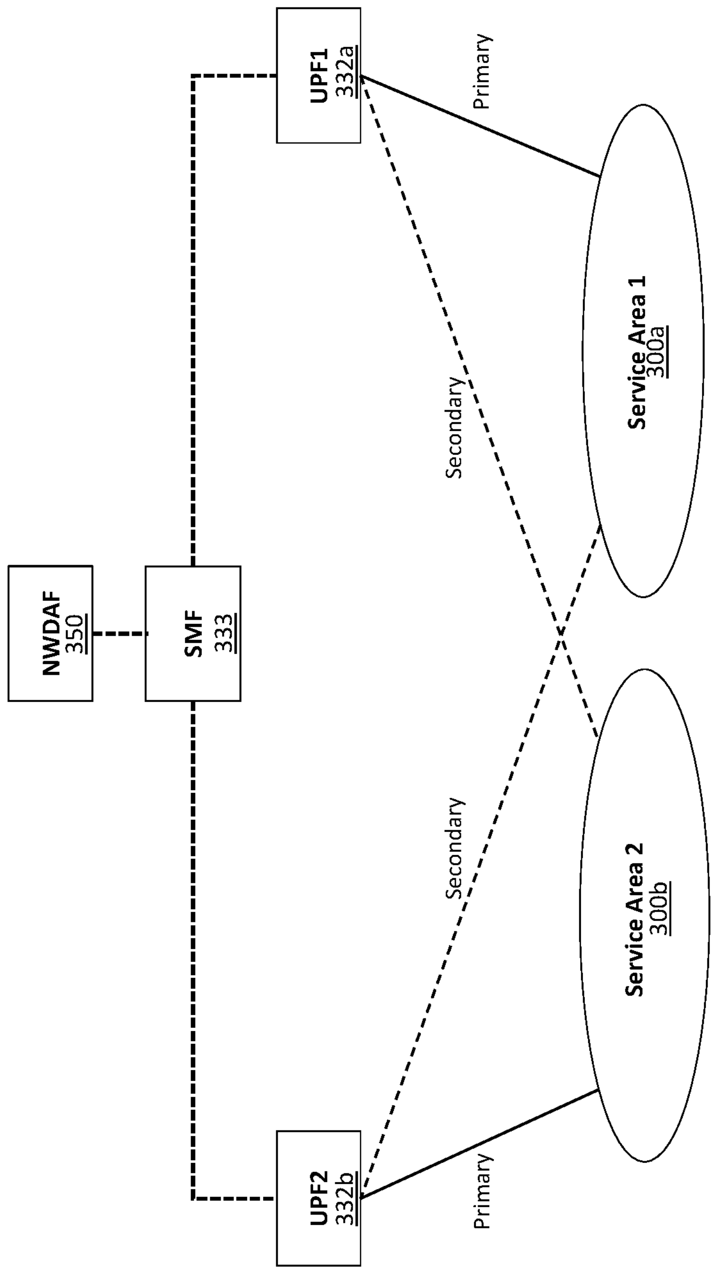
FIG. 3 depicts an embodiment of two user plane functions (UPFs) servicing two UPF service areas in accordance with embodiments described herein.

FIG. 3 depicts an embodiment of two user plane functions (UPFs) 332*a*, 332*b* associated with UPF service areas 300*a*, 300*b* in accordance with embodiments described herein. Only two UPFs 332*a*, 332*b* sharing two UPF service areas 300*a*, 300*b* are depicted in FIG. 3 for simplicity of illustration. Three or more UPFs may share three or more UPF services areas, and each UPF may be associated with one or more UPF service areas, for example, with other UPFs not depicted in FIG. 3. Moreover, although FIG. 3 illustrates service areas 300*a*, 300*b* as being oval, embodiments are not so limited. Rather, service areas 300*a*, 300*b* may be any regular or irregular shape created by the coverage areas of the base stations associated with that service area. The UPFs 332*a*, 332*b* are serviced by an SMF 333. The SMF 333 is an embodiment of the SMF 133 of FIGS. 1A-1C. In some embodiments, a network data analytics function (NWDAF) 350 is accessible by the SMF 333, as depicted in FIG. 3.

Each of the UPFs 332*a*, 332*b* may service the UPF service areas 300*a*, 300*b* as a primary service area or a secondary service area, as indicated by solid lines for primary and dashed lines for secondary. The UPF service areas 300*a*, 300*b* may share no tracking areas between them. Namely, the UPF service areas 300*a*, 300*b* may be free of any overlap therebetween. The UPF 332*a* may be referred to as the first UPF 332*a*, the UPF 332*b* may be referred to as the second UPF 332*b*, the service area 300*a* may be referred to as the first service area 300*a* and the service area 300*b* may be referred to as the second service area 300*b*. The first UPF 332*a* may service the first service area 300*a* as a primary service area (or "first primary service area") and may service the second service area 300*b* as a secondary service area (or "first secondary service area"). The second UPF 332*b* may service the second service area 300*b* as a primary service area (or "second primary service area") and may service the first service area 300*a* as a secondary service area (or "second secondary service area"). In some embodiments, the first UPF 332*a* and/or the second UPF 332*b* may service other service areas not depicted in FIG. 3, for example, as additional secondary service areas.

In some embodiments, a UPF services a UPF service area as a primary service area due to closer geographical proximity thereof. For example, the first service area 300*a* may be a UPF service area that is closer geographically to the first UPF 332*a* and the second service area 300*b* may be a UPF service area that is further geographically from the first UPF 332*a*. Servicing UPF service areas by UPFs that are in closer geographic proximity may be advantageous to reduce latency between the UPF and UEs in TAs in the geographically proximate UPF service area. As such, the first UPF 332*a* may service the first service area 300*a* as a primary service area due to lower latency between the first UPF 332*a* and the first service area 300*a*. When a UPF service area is the primary service area of a UPF (e.g., the first service area 300*a* is the primary service area of the first UPF 332*a*), the UPF may be referred to as a "primary UPF" of the UPF service area. When a UPF service area is a secondary service area of a UPF (e.g., the second service area 300*b* is a secondary service area of the first UPF 332*a*), the UPF may be referred to as a "secondary UPF" of the UPF service area. Generally, each UPF may have only one primary service area, and may have one or more secondary service areas.

Without "flexible" or "intelligent" provisioning of UPF resources, the SMF 333 may connect any requesting UE to the primary UPF for the UPF service area in which the UE is located, regardless of load on the primary UPF and/or the secondary UPF. In embodiments of the disclosure, however, the SMF 333 may connect a UE to a secondary UPF when the primary UPF has load that exceeds a load threshold value, when first load of the primary UPF exceeds second load of the secondary UPF, based on current or future loads, on request to connect or when already connected, and any combination thereof. For example, the UE may be initially connected to the primary UPF, then may have an IP anchor point moved to the secondary UPF based on current or future load of the primary UPF exceeding that of the secondary UPF. Detailed description of processes for connecting a UE to a UPF is provided with reference to FIGS. 4 and 5 below.

Still referring to FIG. 3, the UPFs 332*a*, 332*b* are embodiments of the UPF 132, and may be the same as or similar to the UPF 132 and the UPF 232 described with reference to FIGS. 1A-1C and FIG. 2 above. For example, the UPFs 332*a*, 332*b* may be included in the core network 130 of FIGS. 1A-1C, and may each have tracking areas, such as the tracking areas 210*a*-2101. The UPFs 332*a*, 332*b* may perform packet processing including routing and forwarding, quality of service (QOS) handling, and packet data unit (PDU) session management. The UPFs 332*a*, 332*b* may serve as an ingress and egress point for user plane traffic and provide anchored mobility support for user equipment, such as between the UE 108 and the data network 180 as the UE 108 moves between coverage areas, as described with reference to FIGS. 1A-1C.

The UPFs 332*a*, 332*b* include a first UPF (UPF1) 332*a* and a second UPF (UPF2) 332*b*. UPF1 332*a* is associated with a first service area 300*a*. The first service area 300*a* may be the same as or similar to the UPF service area 200 described with reference to FIG. 2. For example, the first service area 300*a* may include or consist of a first plurality of tracking areas. UPF2 332*b* is associated with a second service area 300*b*, which may be the same as or similar to the UPF service area 200. The second service area 300*b* may include or consist of a second plurality of tracking areas.

SMF 333 may perform session management, user plane selection, and IP address allocation. An SMF service area may refer to a group of service areas of all UPFs which may be controlled by one SMF. For example, in FIG. 3, the SMF service area of SMF 333 includes at least UPF service areas 300*a*, 300*b*.

The SMF 333 is an embodiment of the SMF 133 in FIG. 1B. In some embodiments, the SMF 333 may query an NRF, such as the NRF 136 in FIG. 1C, to acquire UPF information from a variety of sources. The UPF information may include locations of the UPFs 332*a*, 332*b*, a location of a UE (e.g., the UE 108), the UPFs' dynamic loads, the UPFs' static capacity among UPFs supporting the same data network, and the capability of the UPFs 332*a*, 332*b*. UPF dynamic load may refer to a predicted future load of each UPF based on current connection information, historic connection information or both. The UPFs 332*a*, 332*b* may track various statistics regarding the volume of data transferred by each PDU session and provide the information to the SMF 333.

The SMF 333 may also query NWDAF 350 to acquire some or all of the UPF information. For example, the NWDAF 350 may be a network function in the 5G network that collects and analyzes data from various sources in the 5G network, such as UEs, RANs, UPFs, management functions and the like. The NWDAF 350 may provide information, such as network traffic and user behavior, which can be used to improve network performance, improve quality of service, and support a variety of use cases, such as the network slicing and traffic management. The NWDAF 350 may use one or more machine learning algorithms to process large volumes of historic data and provide recommendations and/or predictions to other network functions, such as the SMF 333.

The NWDAF 350 may provide a range of information about network performance and user behavior in 5G networks. For example, the NWDAF 350 may provide information about traffic patterns, such as identifying patterns in network traffic including types of applications being used, volume of data being transmitted, and locations of users. The NWDAF 350 may provide information about network resource usage. For example, the NWDAF 350 may monitor the usage of network resources, such as bandwidth, CPU, and memory, and provide recommendations for improving resource allocation. The NWDAF 350 may provide information about quality of service. For example, the NWDAF 350 may measure the quality of service being provided to users, including network latency, throughput, and packet loss. Other operations of the NWDAF 350 may include detection and mitigation of network security threats (e.g., malware and distributed denial-of-service attacks) and analysis of user behavior, such as device usage, location, and preferences. In some embodiments, the NWDAF 350 is not included.

Figure 4:
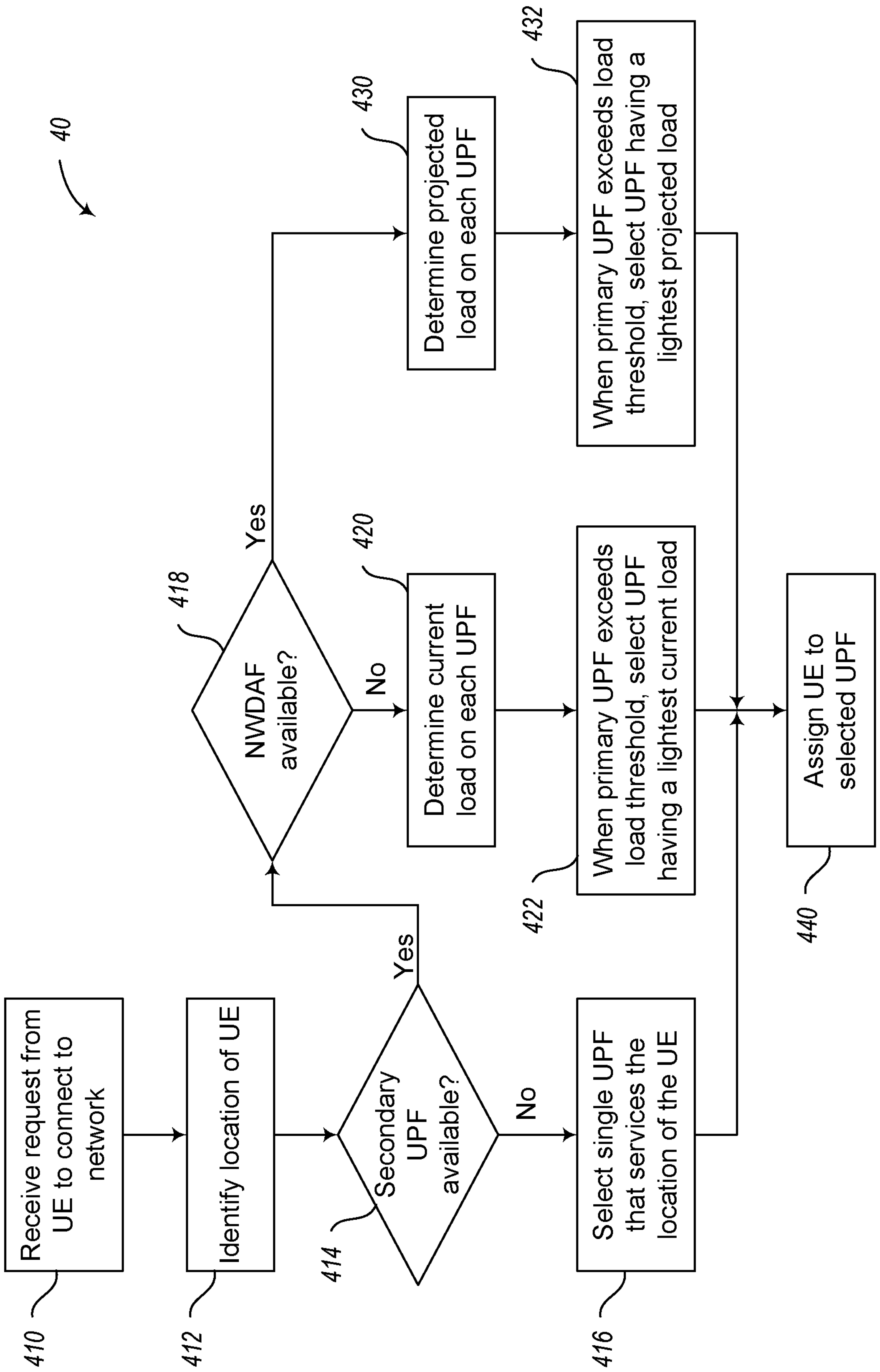
FIG. 4 illustrates a logical flow diagram showing one embodiment of a process for dynamically determining how to provision networking services in accordance with embodiments described herein.

FIG. 4 illustrates a logical flow diagram showing one embodiment of a process 40 for dynamically determining how to provision networking services in accordance with embodiments described herein. In some embodiments, the process 40 includes a number of operations (410, 412, 414, 416, 418, 420, 422, 430, 432 and 440). The process 40 will be further described according to one or more embodiments. It should be noted that the operations of the process 40 may be rearranged or otherwise modified within the scope of the various aspects. It should further be noted that additional processes may be provided before, during, and after the process 40, and that some other processes may be only briefly described herein. For example, prior to the operation 410, a first UPF may be initialized for a first service area, and a second UPF may be initialized for a second service area.

Some or all of the operations of the process 40 may be performed by elements of the 5G network described with reference to FIGS. 1A-3 and may be described with reference to said elements. Process 40 is performed by one or more processors executing computer instructions. In some embodiments, process 40 is performed by specifically designed hardware. In some embodiments, process 40 is performed by a combination of hardware and software. The process 40 may be performed by one or more elements of core network 130, such as SMF 333, AMF 134, other elements thereof or combinations thereof. For example, identifying location of a UE may be performed by SMF 333, AMF 134, or both. Selecting a UPF to connect a UE to may be performed by SMF 333. Determining loading of UPFs may be performed by SMF 333, NWDAF 350, or both. The process 40 may be performed by or in a 5G network having elements that are different in one or more respects from those described with respect to, and depicted in, FIGS. 1A-3.

Process 40 begins at operation 410 where a request is received from a UE, such as the UE 108, to connect to the 5G network. The UE may initiate the request to connect, for example, to the data network. The request may be to connect to a cellular network, such as to initiate a cellular call with another UE. The request is routed to the SMF, such as the SMF 133 or SMF 333. In the example of connecting to the data network, such as the DN 180, the UE may initiate a request to connect to the data network by sending a message called a PDU Session Establishment Request to the SMF. The PDU Session Establishment Request may be sent over the control plane of the 5G network using the Next Generation Application Protocol or "NGAP" signaling protocol. The NGAP protocol is used to communicate between different network functions, such as the UE, the SMF, and other network elements. The PDU Session Establishment Request message may include information such as identity of the UE, the requested service type, and the QoS requirements for the requested service. This information is used by the SMF to authenticate the UE and establish a session for it.

Once the SMF receives the PDU Session Establishment Request message from the UE, the SMF may initiate the session establishment process and select a UPF to handle the data traffic for the UE. The SMF may also consult other network functions such as a policy control function (PCF) to determine the appropriate QoS policies for the UE. Selection of a beneficial UPF is described in the following with reference to operations 412, 414, 416, 418, 420, 422, 430, 432 and 440.

In operation 412, following receipt of the request, a location of the UE is identified. The "location" of the UE in the 5G network may be referred to as the "TA location" and is not necessarily the same as a geographic location of the UE. The TA groups together a set of base stations in a geographical area, which allows the 5G network to efficiently manage UE mobility and handover between base stations. The TA can cover a relatively large geographic area, such as a city or a region, and may be identified by a tracking area identifier (TA ID). On the other hand, the geographic location of a UE may refer to physical position of the UE on the earth's surface, which may be determined by Global Positioning Satellite (GPS) or other location technologies (e.g., WiFi, Cell-ID, or the like). The geographic location of the UE may be used for a variety of purposes, such as location-based services or emergency services. The TA location and geographic location may be related but serve different purposes in the 5G network. In the following, "the location" generally refers to the TA location, unless otherwise specified.

Identifying the location of the UE may be identifying a TA in which a node or base station to which the UE is connected is located. In the 5G network, TAs may be used to identify a geographical area in which the UE may be reached by a set of base stations. Each TA may be associated with one or more AMF nodes in the core network. To associate TAs with UPFs, the core network may maintain a mapping between TAs and UPFs. When the UE performs a TAU procedure and updates its location information, the AMF may notify one or more UPFs about the new location of the UE. This allows the UPFs to update their routing tables and forward the data packets to the correct destination.

In the 5G network, the mapping between a UPF and a TA may be stored in the AMF. The AMF is responsible for managing the mobility of UE and for controlling the establishment, modification, and release of a UE's connection to the network. The AMF may maintain a database of the current location and mobility state of each UE, which includes the current TA that the UE is attached to. When a UE initiates a data transfer, the AMF may use the current location information of the UE to select a UPF for the data transfer. The AMF may also communicate with other network functions, such as the SMF, to coordinate the establishment of the data path between the UE and the selected UPF. When the UE initiates a data session, data packets may first be sent to the UPF in the core network. The UPF may route and forward the data packets to a selected destination, and the UPF knowing the TA location of the UE is beneficial to performing this task.

When the UE moves from one TA to another, the UE may perform a tracking area update (TAU) procedure to update the location information thereof in the core network. The TAU procedure may involve signaling between the UE and the AMF to update the location information. In operation 412, the location that is identified may be an initial location associated with an initial TA that the UE attaches to when making the request to connect to the 5G network. In some embodiments, in operation 412, the location is the new location that is generated in the TAU procedure. For example, the UE may connect to a TA outside the UPF service area initially in operation 410 and may be connected to a TA inside the UPF service area when the operation 412 is performed.

In operation 414, following identification of the location of the UE, a determination is made whether a secondary UPF is available. For example, the UE may be in a tracking area that is serviced by a primary UPF and one or more secondary UPFs. Operation 414 may follow operation 412. The determination may be made by the SMF 333. For example, the SMF 333 may query the location of the UE from the AMF. The location may be the TA to which the UE is attached or the node or base station to which the UE is attached. When the location is the node or base station to which the UE is attached, the AMF may inform the SMF 333 about updates of the TA based on the node or base station. For example, the SMF may query the mapping between a TA and a node or base station from the AMF. In some embodiments, when the UE goes outside the service area of a UPF or an SMF, the network will add an I-UPF or an I-SMF between the UPF and gNB or between the SMF and the AMF. When the secondary UPF is available, the process 40 may proceed from operation 414 to operation 418. When no secondary UPF is available (i.e., the TA in which the UE is located is serviced by only a single UPF), the process 40 may proceed from operation 414 to operation 416.

Operation 416 follows operation 414 when no secondary UPF is available. In operation 416, in response to a secondary UPF not being available, the single UPF associated with the service area in which the UE is located may be selected.

Operation 418 follows operation 414 when a secondary UPF is available. In operation 418, in response to secondary UPF being available, a determination is made whether an NWDAF, such as the NWDAF 350, is available. The SMF may access the NWDAF and obtain network data to support session management functions. In some embodiments, the NWDAF may be optional and may not be included, and in response to the secondary UPF being available in operation 414, process 40 may proceed to operation 420. When the NWDAF is available, the process 40 may proceed from operation 418 to operation 430. When the NWDAF is not available, the process 40 may proceed from operation 418 to operation 420.

When a determination is made that an NWDAF is not available, the process 40 proceeds from operation 418 to operation 420, in which respective current loads of two or more UPFs associated with the UPF service area are determined. "Loading" or "load" of a UPF may generally refer to amount of traffic and data that is being processed and forwarded by the UPF at a given time. The load may refer to number of UEs anchored at the UPF. At any time, some of the UEs are active and some others of the UEs are idle. The traffic may refer only to the active UEs while the idle UEs are also anchored on the UPF. The UPF is responsible for processing and forwarding data packets in the data plane of the 5G network. As data sessions are established and traffic flows through the network, the UPF may experience varying levels of traffic and data processing demands. When the traffic and data processing demands exceed the UPF's capacity, it may become overloaded and unable to process all the traffic and data in a timely manner. The term "loading" or "load" is also used to describe the level of traffic and data processing demands that the UPF is experiencing at a given time. High levels of loading can result in increased latency, packet loss, and other performance issues for data sessions that are being handled by the UPF.

The "current load" may refer to loading of a UPF at a current moment in time. In a 5G network without an NWDAF, the SMF has the respective loads of the UPFs it manages.

Operation 420 follows operation 418 when the NWDAS is not available. In operation 420, a first load of the UPF1 332*a* and a second load of the UPF2 332*b* may be determined. The first load may be a first current load and the second load may be a second current load. The first current load and the second current load may be determined by any of the methods just described. In some embodiments, operation 420 may be performed when the NWDAS is available and it is advantageous for the current load of each UPF to be determined instead of the future load.

Operation 422 may follow operation 420. In operation 422, a UPF having the lightest current load is selected. For example, the UE may be located in the primary service area of UPF1 332*a*. When first current load of UPF1 332*a* and second current load of UPF2 332*b* are 30% and 12%, respectively, the SMF 333 selects UPF2 332*b*, such that the UE is assigned to UPF2 332*b* (i.e., the secondary UPF) based on the first current load exceeding the second current load. In another example, when the first and second current loads of UPF1 332*a* and UPF2 332*b* are 30% and 42%, respectively, the SMF 333 selects UPF1 332*a*, such that the UE is assigned to UPF1 332*a* (i.e., the primary UPF) based on the second current load exceeding the first current load. As such, overutilization or underutilization of resources of UPF1 332*a* or UPF2 332*b* may be avoided.

In some embodiments, assigning the UE to the secondary UPF may be further based on whether the primary UPF has loading exceeding a threshold value. This can be beneficial, say, when service provided by the primary UPF is better than service provided by the secondary UPF. For example, loading of the primary UPF may be below the threshold value (e.g., 50%) while still exceeding loading of the secondary UPF. As one specific example, loading of the primary UPF may be 10% whereas loading of the secondary UPF may be 5%. In such embodiments, as long as the loading of the primary UPF is below the threshold value (e.g., 10% is below 50%), the UE may be assigned to the primary UPF to obtain benefits of connecting to the primary UPF, regardless of whether the loading of the secondary UPF is lower. When the loading of the primary UPF exceeds the threshold value, assignment of the UE to the primary or secondary UPF may be based on which of the primary or secondary UPF has the lighter load.

Operation 430 may follow operation 418 when the NWDAF is available. In operation 430, in response to the NWDAF (e.g., the NWDAF 350) being available, a future load is determined for the UPFs, such as the UPF1 332*a* and the UPF2 332*b*. The NWDAF may determine the future load or loading of a UPF in the 5G network by analyzing data from multiple sources in the 5G network and using algorithms (e.g., machine learning algorithms) to make predictions based on historical data and current network conditions. For example, the NWDAF may collect data from various sources such as the NSSF, the PCF and the TDF to understand network traffic patterns, user behavior, and network conditions. Using this data, the NWDAF may predict the future loading of a UPF by analyzing historical patterns and applying machine learning algorithms to data on current network conditions. Although not depicted in FIG. 4, it should be understood that the current load may be determined by the NWDAF 350 when the NWDAF 350 is available and may be used in operation 430 instead of the future load.

Operation 432 may follow operation 430. In operation 432, a UPF having the lightest future load is selected. For example, the UE may be located in the primary service area of UPF1 332*a*, and first current load and second current load of UPF1 332*a* and UPF2 332*b* may be 20% and 25%, respectively, but in a near future, first future load and second future load of UPF1 332*a* and UPF2 332*b*, respectively, may be predicted to be 40% and 30%, respectively. In this example, the SMF 333 may not connect the UE to UPF1 332*a* (with 20% current load) but instead may connect the UE to UPF2 332*b* (with 25% current load) based on the first future load exceeding the second future load. As such, the SMF 333 may select UPF2 332*b*, such that the UE in the first UPF service area 300*a* is assigned to UPF2 332*b* (i.e., the secondary UPF). When the second future load exceeds the first future load, the SMF 333 may select UPF1 332*a*, such that the UE in the first UPF service area 300*a* is assigned to UPF1 332*a* (i.e., the primary UPF).

In some embodiments, the NWDAF 350 predicts the first and second future loads of UPF1 332*a* and UPF2 332*b*, respectively, and the SMF 333 may connect the UE to UPF1 332*a* and UPF2 332*b* based on a weighting. For example, the NWDAF 350 may predict the first and second future loads to be “60%” and “20%”, respectively. Based on the predicted first and second future loads, the SMF 333 may connect a first percentage or “first weighting percentage” of UEs in the UPF service area 300*a* (e.g., “u %=25%”) to UPF1 332*a* and a second percentage or “second weighting percentage” of UEs in the UPF service area 300*a* (e.g., “w %=75%”) to UPF2 332*b*. When the first future load exceeds the second future load, u is less than w (u % and w % may be 0% and 100%). When the second future load exceeds the first future load, w is less than u (u % and w % may be 100% and 0%). In some embodiments, the first and second weighting percentages are calculated based on a current first load of the first user plane function, a current second load of the second user plane function, the predicted first and second future loads and number of tracking areas in the UPF service area.

In some embodiments, the NWDAF 350 may predict a rate of UEs connecting to the UPFs in the future. Based on the rate predicted, at a selected load level of UPF1 332*a*, the SMF 333 may begin moving UEs connected to UPF1 332*a* to UPF2 332*b*.

Similar to operation 422 above, assigning the UE to the secondary UPF may be further based on whether the primary UPF has future loading exceeding a threshold value. For example, future loading of the primary UPF may be below the threshold value (e.g., 50%) while still exceeding future loading of the secondary UPF. As one specific example, future loading of the primary UPF may be 10% whereas future loading of the secondary UPF may be 5%. In such embodiments, as long as the future loading of the primary UPF is below the threshold value (e.g., 10% is below 50%), the UE may be assigned to the primary UPF to obtain benefits of connecting to the primary UPF, regardless of whether the future loading of the secondary UPF is lower. When the future loading of the primary UPF exceeds the threshold value, assignment of the UE to the primary or secondary UPF may be based on which of the primary or secondary UPF has the lighter future load.

Operation 440 follows each of operation 416, operation 422 and operation 432. In operation 440, the UE is assigned to the UPF selected in operation 416, operation 422 or operation 432. For example, when establishing a data path between a UE and a data network, the following may be performed. The SMF may communicate with the AMF to coordinate the establishment of the data path. The SMF may indicate to the AMF the UPF selected in operation 416, operation 422 or operation 432. The AMF may then send a request to the UPF selected to establish the data path. The UPF may establish the data path by setting up a tunnel between the UE and the data network, for example, to establish beneficial routing and forwarding rules. Once the data path is established, the UPF begins forwarding user data packets between the UE and the rest of the 5G network.

The process 40 may be beneficial due to being based on number of anchoring UEs as the load. The average load of a UE can be a good measure for aggregate traffic (low of large numbers in statistics). As such, the number of UEs can be a good measure of UPF load.

The process 40 is beneficial to prevent overprovisioning of UPFs by intelligent leveraging of the primary and secondary service areas, which improves utilization of resources of the 5G network.

Figure 5:
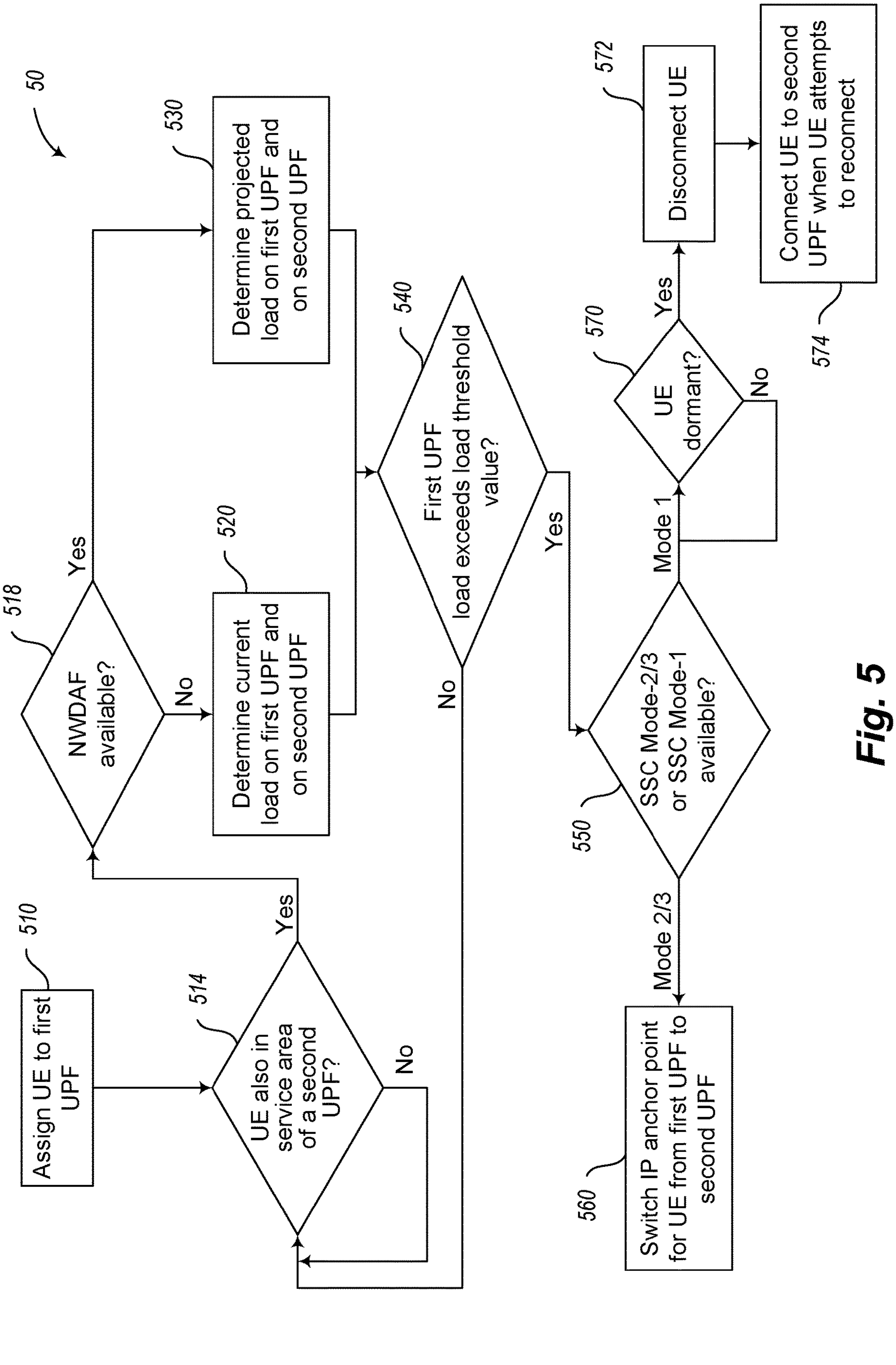
FIG. 5 illustrates a logical flow diagram showing another embodiment of a process for dynamically determining how to provision networking services in accordance with embodiments described herein.

FIG. 5 illustrates a logical flow diagram showing another embodiment of a process 50 for dynamically determining how to provision networking services in accordance with embodiments described herein. In some embodiments, the process 50 includes a number of operations (510, 514, 518, 520, 530, 540, 550, 560, 570, 572 and 574). The process 50 will be further described according to one or more embodiments. It should be noted that the operations of the process 50 may be rearranged or otherwise modified within the scope of the various aspects. It should further be noted that additional processes may be provided before, during, and after the process 50, and that some other processes may be only briefly described herein.

Some or all of the operations of the process 50 may be performed by elements of the 5G network described with reference to FIGS. 1A-3 and may be described with reference to said elements. Process 50 is performed by one or more processors executing computer instructions. In some embodiments, process 50 is performed by specifically designed hardware. In some embodiments, process 50 is performed by a combination of hardware and software. Process 50 may be performed by one or more elements of core network 130, such as SMF 333, AMF 134, other elements thereof or combinations thereof. For example, identifying location of a UE may be performed by AMF 134. Selecting a UPF to connect a UE to may be performed by SMF 333. Determining loading of UPFs may be performed by SMF, NWDAF, or both. The process 50 may be performed by or in a 5G network having elements that are different in one or more respects from those described with respect to, and depicted in, FIGS. 1A-3.

The process 50 begins with operation 510, in which a UE is assigned to a first UPF, such as UPF1 332*a*. Assignment of the UE to the first UPF in operation 510 may be performed as described with reference to FIG. 4. For example, the UE may be assigned to UPF1 332*a* based on the UE being located in the first service area 300*a*. In another example, the UE may be assigned to the UPF2 332*b* while in the first service area 300*a* due to the first load of the UPF1 330*a* exceeding the second load of the UPF2 332*b*.

Operation 514 follows operation 510. In operation 514, determination is made whether the UE is located in a UPF service area associated with a second UPF different than the first UPF. For example, the UE may be assigned to the UPF1 332*a* and may be located in the first service area 300*a*, which is also serviced by the UPF2 332*b* as a secondary service area thereof. Details of operation 514 are similar to those described for operation 414 of FIG. 4. In response to determining that the UE is not in a UPF service area of a second UPF, the process 50 returns to operation 514 to track the UE location and determine if the UE is located in a UPF service area of a second UPF. For example, a second UPF may begin servicing the UPF service area in which the UE is located after a period of time passes after the UE connects to the first UPF that services the UPF service area. The process 50 may not proceed further until determination is made that a second UPF is servicing the UPF service area in which the UE is located. When the UE is located in a UPF service area serviced by a second UPF, the process 50 proceeds from operation 514 to operation 518.

Operation 518 follows operation 514. In operation 518, in response to determining that the UE is located in a UPF service area serviced by a second UPF, determination is made whether an NWDAF is available, which is the same in most or all respects to operation 418 of FIG. 4. When the NWDAF is available, the process 50 proceeds to operation 530. When the NWDAF is not available, the process 50 proceeds to operation 520.

Operation 520 follows operation 518 when the NWDAF is not available. In operation 520, in response to determining that the NWDAF is not available, first and second current loads on first and second UPFs are determined, which is the same in most or all respects to operation 420 of FIG. 4.

Operation 530 follows operation 518 when the NWDAF is available. In operation 530, in response to determining that the NWDAF is available, first and second projected or future loads on first and second UPFs are determined, which is the same in most or all respects to operation 430 of FIG. 4. In some embodiments, when the NWDAF is available, first and second current loads are determined in operation 530 instead of the first and second projected or future loads, which may be advantageous for improving resource utilization of the UPFs.

Operation 540 follows each of operations 520 and 530. In operation 540, determination is made whether the first load (e.g., the first current load or the first future load) of the first UPF exceeds a threshold value or "load threshold value." Operation 540 may include determining whether the first load exceeds the load threshold value, whether the second load exceeds the load threshold value, or both. For example, the load threshold value may be associated with a percent of capacity of each UPF above which the respective UPF is close to being overloaded. For example, the percent may be 60%, 70% or another selected percentage of capacity that is beneficial for preventing overload of the UPF. When determination is made that the first UPF load does not exceed the load threshold value, the UE being already connected to the first UPF in operation 510, the process 50 returns to operation 514. In some embodiments, the process 50 may return to operation 520 instead of returning to operation 514 as depicted in FIG. 5.

In some embodiments, operation 540 instead determines whether the first UPF load exceeds the second UPF load of the second UPF. When determination is made that the first UPF load does not exceed the second UPF load, the UE being already connected to the first UPF in operation 510, the process 50 returns to operation 514. In some embodiments, the process 50 may return to operation 520 instead of returning to operation 514 as depicted in FIG. 5.

Operation 550 follows operation 540 when the load of the first UPF exceeds the load threshold value, or when the first UPF load exceeds the second UPF load. In operation 550, in response to determination being made that the first UPF load exceeds the load threshold value (or that the first UPF load exceeds the second UPF load), determination is made whether Session and Service Continuity (SSC) mode 2, SSC mode 3 or SSC mode 1 is available. The 5G network may support three different SSC modes, which may not change during an entire life cycle of a PDU session. Namely, a PDU connection may be set to SSC mode-X (X=1, 2 or 3) when established, then the SSC mode of the PDU session may not be modified until the PDU session is deactivated. It should be understood that, although specific modes are currently described (e.g., SSC modes 1, 2 and 3), the modes may change or be renamed or additional modes may be added. As such, functionality of the modes dictates the flow of process 50. For example, SSC mode 2 and SSC mode 3 allow IP anchor of the UE to be switched from one UPF to another UPF without disconnecting the UE from the 5G network. In SSC mode 1, the IP anchor is fixed to the UPF, and the UE is disconnected to release the IP anchor before being able to establish a new IP anchor fixed to another UPF. It should be understood that progression from operation 550 to either operation 560 or operation 570 may be based on a selected priority for SSC modes 2 and 3 over SSC mode 1. Namely, when all three of SSC modes 1, 2 and 3 are available, the process 50 may proceed to operation 560 instead of to operation 570, as it may be advantageous to switch the IP anchor point seamlessly (e.g., SSC modes 2 and 3) instead of disconnecting the UE only after the UE becomes dormant (e.g., SSC mode 1).

In operation 560, following operation 550 when SSC mode 2 and/or SSC mode 3 is available, in response to SSC mode 2 and/or SSC mode 3 being available, the IP anchor point for the UE is switched from the first UPF to the second UPF. For example, when SSC mode 2 or SSC mode 3 is supported the IP anchor point of a plurality of UEs may be switched. The plurality of UEs may be a percentage of UEs in the UPF service area. Description of SSC modes 2 and 3 follows.

For PDU sessions in SSC mode 2, in order to maintain continuous service, the 5G network may allow the UE to release a current PDU session and then immediately initiate a new PDU session establishment process. The 5G network initiates the PDU session release process, and a PDU session establishment process for accessing the same network may be initiated immediately after the UE is notified to release the PDU session. The UE may then re-initiate the PDU session establishment request. As such, the IP anchor may be switched from the first UPF to the second UPF without disconnecting the UE from the 5G network.

For PDU sessions in SSC mode 3, the 5G network may allow a connection to be established via a new PDU session anchor before the connection between the UE and the previous PDU session anchor is released. As such, when migrating the anchor point, a PDU session connection may initially be established through the new anchor point, followed by release of the old anchor point PDU session connection. The difference with SSC mode 2 is that in mode 3, the connection of the new anchor point is first established and then the connection of the old anchor point is released to ensure the continuity of the service. The migration may begin with the SMF determining to migrate the UPF of the current PDU session. An AMF may send a message to the UE including parameters related to the migration, such as the PDU session to be migrated, how long the 5G network will retain the current PDU session, and the like. After receiving the message, the UE may initiate a new PDU session establishment process. After the new PDU session is established, the UE may begin using an IP address associated with the new PDU session for all new traffic and may also actively move existing traffic flows from the old PDU session to the new PDU session. The UE may then release the old PDU session before a PDU Session Address expiration timer expires, or the SMF initiates the release process of the old PDU session after the PDU Session Address expiration timer expires.

SSC modes 2 and 3 may not be available in some cases, and SSC mode 1 may be available instead. In operations 570, 572, 574, in response to SSC mode 1 being available, the IP anchor point for the UE is switched from the first UPF to the second UPF. For example, when SSC Mode 1 is supported, the IP anchor point of a plurality of UEs may be switched. The plurality of UEs may be a percentage of UEs in the UPF service area.

For PDU sessions in SSC mode 1, the 5G network maintains a UPF that acts as an anchor of the PDU session when the PDU session is established, regardless of access technology (e.g., access type and cell) that a UE continues to use to access the network. For an IP-type PDU session, an IP address assigned to the UE remains unchanged, which may also be referred to as IP address continuity.

As such, in operation 570, following operation 550 when SSC mode 1 is available, determination is made whether the UE is dormant. In response to determining that the UE is not dormant, the process 50 remains at operation 570. In the 5G network, the UE may be considered to be dormant when the UE is not actively transmitting or receiving data. For example, the determination may be made based on RRC state, which may be a signal that is transmitted by the UE to the 5G network to indicate current state of the UE. When the UE is in an idle state, the UE may be considered to be dormant. The determination may be made based on an inactivity timer. For example, the 5G network may set an inactivity timer to monitor activity of the UE. When there is no activity from the UE during the timer period, the UE may be considered to be dormant. The determination may be made based on network signaling. For example, the network may send signaling messages to the UE to determine if the UE is active or dormant. If the UE does not respond to one or more of the signaling messages, the UE may be considered to be dormant.

In operation 572, following operation 570, in response to determining that the UE is dormant, the UE is disconnected from the 5G network 572. For example, the network may release radio resources allocated to the UE in operation 572.

In operation 574, following operation 572, when the UE becomes active again, the UE may request new resources from the 5G network, at which point, the UE may be connected to the second UPF. In some embodiments, the load of the first UPF may be reassessed when the request to reconnect is received, and if the first UPF continues to exceed the load threshold value, the UE may be connected to the second UPF. The user equipment may be reconnected to the first UPF in operation 574 when the load of the first UPF no longer exceeds the load threshold value when the request to reconnect is received.

Figure 6:
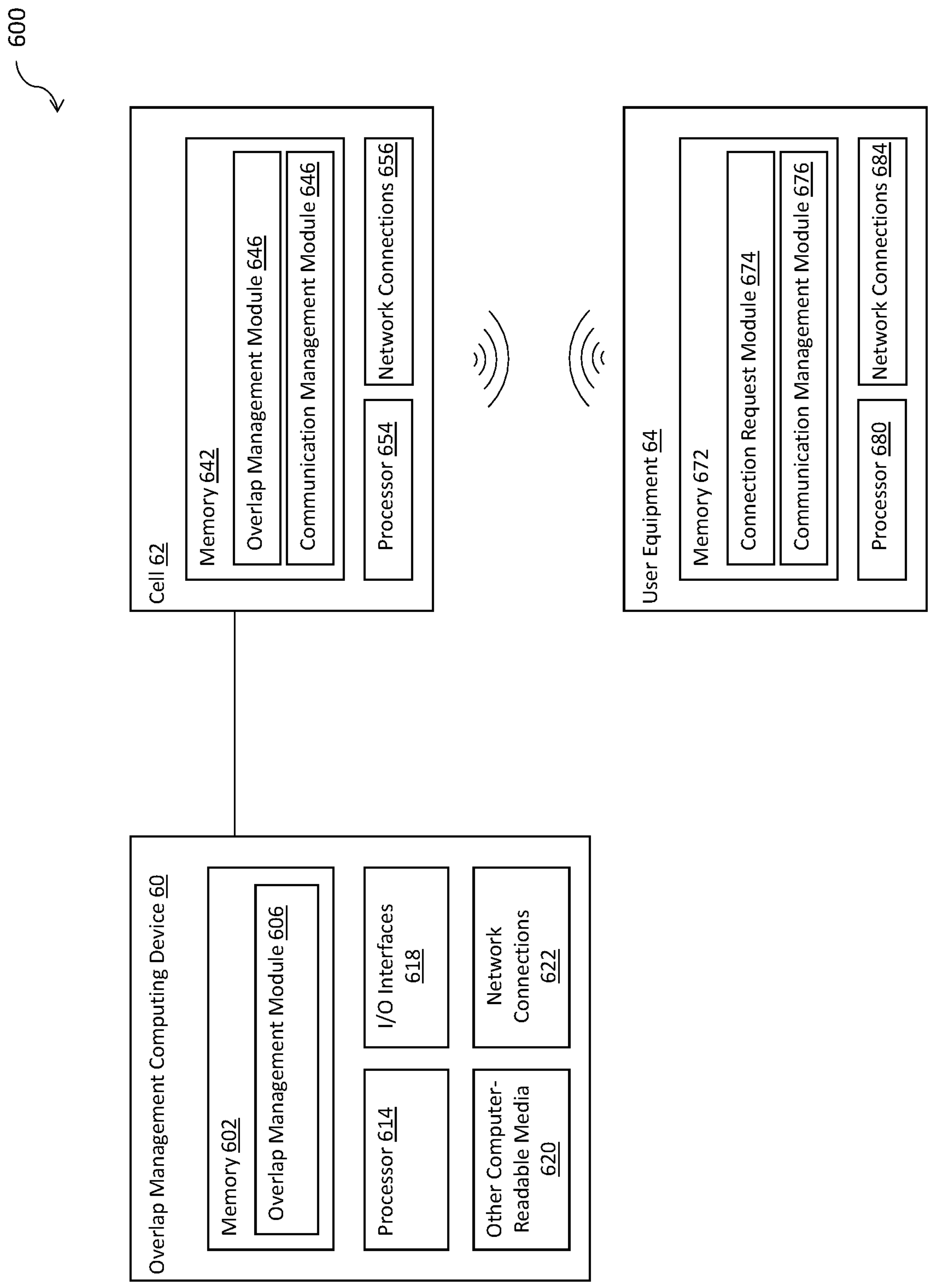
FIG. 6 depicts one embodiment of a system for dynamically determining how to provision networking services in accordance with embodiments described herein.

FIG. 6 shows a system diagram that describes various implementations of computing systems for implementing embodiments described herein. System 600 includes a service management computing device 602, cell 62 and a user equipment 64. In this example, assume cell 62 is the first or current cell that is managing communications for the user equipment 64.

System 600 may include more cells and more user equipment than what is shown, but only two cells and one user equipment are shown in FIG. 6 for ease of discussion.

One or more special-purpose computing systems may be used to implement the service management computing device 60. Accordingly, various embodiments described herein may be implemented in software, hardware, firmware, or in some combination thereof. The service management computing device 60 may include memory 602, one or more processors 614 (e.g., central processing unit, microcontroller, virtual processing resources, etc.), I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by processor 614 to perform actions, including embodiments described herein.

Memory 602 may have stored thereon service management module 606. Although the service management module 606 is illustrated as a single module, embodiments are not so limited. Rather, one module or a plurality of modules may be employed to perform the functionality of the service management module 606. Moreover, the functionality of these modules may also be performed using circuitry or other computer hardware components or software.

The service management module 606 is configured to determine loading of two or more UPFs sharing an overlap area and select one of the UPFs to which to connect a UE in the overlap area based on the respective loadings, as described with reference to FIGS. 2-5. In some embodiments, the service management module 606 may store computer instructions that, when executed by the processor 614, perform embodiments described herein, such as processes 40, 50 in FIG. 4 and FIG. 5, respectively.

Memory 602 may also store other programs and data (not illustrated), which may include additional information about cell 62 and user equipment 64, or other information.

Network connections 622 are configured to communicate with other computing devices, such as cell 62 or other cells not illustrated. In various embodiments, the network connections 622 include transmitters and receivers (not illustrated) to send and receive data and information to the cell 62 (e.g., a base station, as described herein). I/O interfaces 618 may include video interfaces, audio interfaces, other data input or output interfaces, or the like. Other computer-readable media 620 may include other types of stationary or removable computer-readable media, such as removable flash drives, external hard drives, or the like.

Cell 62 manages communications between the user equipment 64 and other computing devices (not illustrated). One or more special-purpose computing systems may be used to implement the cell 62. Accordingly, various embodiments described herein may be implemented in software, hardware, firmware, or in some combination thereof. The cell 62 may include memory 642, one or more processors 654 (e.g., central processing unit, microcontroller, virtual processing resources, etc.), and network connections 656. Although not illustrated, cell 62 may also include I/O interfaces, other computer-readable media, or other computing components.

Memory 642 may include one or more various types of non-volatile and/or volatile storage technologies. In various embodiments, memory 642 may be similar or include similar examples as memory 602. Memory 642 may be utilized to store information, including computer-readable instructions that are utilized by processor 654 to perform actions, including embodiments described herein.

Memory 642 may have stored thereon service management module 646 and communication management module 648. The communication management module 648 may be configured to manage communication for the user equipment 64, as described herein.

Memory 642 may also store other programs and data (not illustrated), which may include additional information about cell 62 and user equipment 64, or other information.

Network connections 656 are configured to communicate with other computing devices, such as user equipment 64, service management computing device 60, or other cells. In various embodiments, the network connections 656 include transmitters and receivers (not illustrated) to send and receive data and information to the user equipment 64, as described herein.

User equipment 64 communicates with other computing devices (not illustrated) via cell 62. One or more special-purpose computing systems may be used to implement the user equipment 64. Accordingly, various embodiments described herein may be implemented in software, hardware, firmware, or in some combination thereof. The user equipment may include memory 672, one or more processors 680 (e.g., central processing unit, microcontroller, virtual processing resources, etc.), and network connections 684. Although not illustrated, user equipment 64 may also include I/O interfaces, other computer-readable media, or other computing components.

Memory 672 may include one or more various types of non-volatile and/or volatile storage technologies. In various embodiments, memory 672 may be similar or include similar examples as memory 602. Memory 672 may be utilized to store information, including computer-readable instructions that are utilized by processor 680 to perform actions, including embodiments described herein.

Memory 672 may have stored thereon connection request module 674 and communication management module 676. The communication management module 676 may be configured to send and receive wireless transmissions with cells 62 to establish communications with other computing devices, as described herein.

The connection request module 674 is configured to request connection with the 5G network, as described herein.

Memory 680 may also store other programs and data (not illustrated), which may include additional information about cell 62 or other information.

Network connections 684 are configured to communicate with other computing devices, such as cell 62. In various embodiments, the network connections 684 include transmitters and receivers (not illustrated) to send and receive data and information from cell 62, as described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:

a memory that stores computer instructions; and a processor configured to execute the computer instructions to:

initialize a first user plane function that services a first service area as a first primary service area and that services a second service area as a first secondary service area;

initialize a second user plane function that services the second service area as a second primary service area and that services the first service area as a second secondary service area;

receive a request from a user equipment to connect to a network;

identify a location of the user equipment;

determine whether the location is in one of the first and second service areas; and in response to the location being in the first service area:

determine a first load of the first user plane function;

in response to the first load not exceeding a load threshold value, connect the user equipment to the first user plane function; and in response to the first load exceeding the load threshold value:

determine a second load of the second user plane function;

in response to the first load exceeding the second load, connect the user equipment to the second user plane function; and in response to the second load exceeding the first load, connect the user equipment to the first user plane function.

2. The system of claim 1, wherein the processor is further configured to execute the computer instructions to:

determine a rate at which the first load is currently changing when the user equipment is connected to the first user plane function; and move the user equipment from the first user plane function to the second user plane function based on the determined rate and the load threshold value.

3. The system of claim 1, wherein the processor is configured to further execute the computer instructions to:

in response to the location being in the second service area:

determine the second load of the second user plane function;

in response to the second load not exceeding a load threshold value, connect the user equipment to the second user plane function;

in response to the second load exceeding the load threshold value:

determine the first load of the first user plane function;

in response to the second load exceeding the first load, connect the user equipment to the first user plane function; and in response to the first load exceeding the second load, connect the user equipment to the second user plane function.

4. The system of claim 1, wherein the processor determines the first load and the second load by being configured to execute the computer instructions to:

determine a first future load of the first user plane function and a second future load of the second user plane function.

5. The system of claim 1, wherein the processor is configured to further execute the computer instructions to:

connect the user equipment to the first user plane function in response to the user equipment being in the first service area and prior to determining the first load of the first user plane function and the second load of the second user plane function.

6. The system of claim 5, wherein the processor is configured to further execute the computer instructions to:

determine whether the first load exceeds the load threshold value while the user equipment is connected to the first user plane function; and in response to the first load exceeding the load threshold value, switch an IP anchor point of the user equipment from the first user plane function to the second user plane function when a session and service continuity mode 2 or mode 3 is available.

7. The system of claim 5, wherein the processor is configured to further execute the computer instructions to:

determine whether the first load exceeds the load threshold value while the user equipment is connected to the first user plane function; and in response to the first load exceeding the load threshold value, when a session and service continuity mode 1 is available:

determine if the user equipment is dormant when the first load exceeds the load threshold value;

in response to determining that the user equipment is dormant, disconnect the user equipment from the first user plane function;

receive a request from the user equipment to reconnect after being disconnected; and connect the user equipment to the second user plane function.

8. A computing device, including:

a memory that stores computer instructions; and a processor that, when executing the computer instructions, causes the computing device to:

initialize a first user plane function for a first service area;

initialize a second user plane function for a second service area, wherein the first service area and the second service area are not overlapping;

receive a request from a user equipment to connect to a network;

query a location of the user equipment;

determine whether the location is serviced by both the first user plane function and the second user plane function;

in response to the location being serviced by both the first user plane function and the second user plane function:

determine a first load of the first user plane function and a second load of the second user plane function;

in response to the first load exceeding the second load and the first load exceeding a load threshold value, connect the user equipment to the second user plane function; and in response to the second load exceeding the first load and the first load exceeding the load threshold value, connect the user equipment to the first user plane function.

9. The computing device of claim 8, wherein the processor, when executing the computer instructions to determine the first load and the second load, causes the computing device to:

predict, by a network data analysis function, the first load and the second load associated with a future time.

10. The computing device of claim 9, wherein the processor, when executing the computer instructions, further causes the computing device to:

generate a first weighting percentage based on the predicted first and second loads;

in response to the predicted first load exceeding the predicted second load, generate a second weighting percentage that is greater than the first weighting percentage;

in response to the predicted second load exceeding the predicted first load, generate the second weighting percentage that is less than the first weighting percentage; and connect a plurality of second user equipment in the first service area to the first user plane function based on the first weighting percentage and to the second user plane function based on the second weighting percentage.

11. The computing device of claim 10, wherein the processor, when executing the computer instructions to generate the first and second weighting percentages, further causes the computing device to:

calculate the first and second weighting percentages based on a current first load of the first user plane function, a current second load of the second user plane function, the predicted first and second loads and number of tracking areas in the overlap area.

12. The computing device of claim 8, wherein the processor, when executing the computer instructions to determine the first load and the second load, causes the computing device to:

determine whether the first load exceeds the load threshold value associated with an overload probability of the first user plane function being above a selected level; and in response to the first load being greater than the load threshold value, modify, under a session and service continuity mode 2 or mode 3, an IP anchor point of the user equipment from the first user plane function to the second user plane function.

13. The computing device of claim 8, wherein the processor, when executing the computer instructions to determine the first load and the second load, causes the computing device to:

determine whether the first load exceeds the load threshold value associated with an overload probability of the first user plane function being above a selected level; and in response to the first load being greater than the load threshold value, under a session and service continuity mode 1:

determine whether the user equipment is dormant;

in response to determining that the user equipment is dormant, disconnect the user equipment from the first user plane function;

receive a reconnect request from the user equipment; and in response to receiving the reconnect request, connect the user equipment to the second user plane function.

14. The computing device of claim 8, wherein the processor, when executing the computer instructions to connect the user equipment to the second user plane function:

connects the user equipment to the second user plane function based on a second future load of the second user plane function being less than a first future load of the first user plane function.

15. A method, comprising:

receiving, at a computing device, a request from a user equipment to connect to a network;

determining, by the computing device, whether a service area that the user equipment is located in is serviced by a primary user plane function and a secondary user plane function; and in response to determining that service area is serviced by the primary and secondary user plane functions:

determining a first load of the primary user plane function;

determining whether the first load exceeds a load threshold value; and in response to determining that the first load exceeds the load threshold value, connecting the user equipment to the secondary user plane function.

16. The method of claim 15, further comprising:

connecting the user equipment to the primary user plane function prior to determining whether the user equipment is in the service area that is serviced by the primary user plane function and the secondary user plane function.

17. The method of claim 16, wherein connecting the user equipment in the service area to the secondary user plane function includes:

determining, by the computing device in a session and service continuity mode 1, whether the user equipment is dormant;

in response to determining that the user equipment is dormant, disconnecting the user equipment from the network; and connecting the user equipment to the secondary user plane function when the user equipment attempts to reconnect to the network after being disconnected.

18. The method of claim 16, wherein connecting the user equipment in the service area to the secondary user plane function includes:

switching, by the computing device in a session and service continuity mode 2 or mode 3, an IP anchor point of the user equipment from the primary user plane function to the secondary user plane function.

19. The method of claim 15, further comprising:

connecting a plurality of second user equipment in the service area to the primary user plane function, including:

generating a first percentage associated with the primary user plane function and a second percentage associated with the secondary user plane function, the first and second percentages being based on a first predicted future load of the primary user plane function and a second predicted future load of the secondary user plane function; and connecting a number of the plurality of second user equipment in the service area to the primary user plane function based on the first percentage.

20. The method of claim 15, further comprising:

moving first user equipment of a plurality of user equipment that are connected to the primary user plane function to the secondary user plane function based on a rate of new user equipment connecting to the primary user plane function and the load threshold value.

* * * * *